United States Patent
Schmidt (10) Patent No.: US 11,378,150 B1
(45) Date of Patent: Jul. 5, 2022

(54) TEMPERATURE COMPENSATED SHOCK ABSORBER

(71) Applicant: Safran Landing Systems Canada Inc., Ajax (CA)

(72) Inventor: Robert Kyle Schmidt, Brooklin (CA)

(73) Assignee: SAFRAN LANDING SYSTEMS CANADA INC., Ajax (CA)

( * ) Notice: Subject to any disclaimer, the term of this patent is extended or adjusted under 35 U.S.C. 154(b) by 0 days.

(21) Appl. No.: 17/147,254

(22) Filed: Jan. 12, 2021

(51) Int. Cl.
*F16F 9/52* (2006.01)
*B64C 25/60* (2006.01)
*F16F 5/00* (2006.01)
*F16F 9/30* (2006.01)

(52) U.S. Cl.
CPC ............. *F16F 9/52* (2013.01); *B64C 25/60* (2013.01); *F16F 5/00* (2013.01); *F16F 9/303* (2013.01)

(58) Field of Classification Search
CPC ...... F16F 9/52; F16F 5/00; F16F 9/303; F16F 9/526; B64C 25/60
See application file for complete search history.

(56) References Cited

U.S. PATENT DOCUMENTS

| | | | | |
|---|---|---|---|---|
| 2,982,537 A | * | 5/1961 | Rumsey | F16F 9/52 267/126 |
| 7,004,293 B2 | | 2/2006 | Schurmans | |
| 2006/0081428 A1 | * | 4/2006 | Schurmans | F16F 9/52 188/276 |
| 2014/0291452 A1 | * | 10/2014 | Martinez | B64G 1/66 244/173.2 |
| 2014/0312171 A1 | | 10/2014 | Schmidt | |
| 2014/0374974 A1 | * | 12/2014 | Goold | F16F 9/52 267/140.13 |
| 2016/0327114 A1 | | 11/2016 | Schmidt | |

FOREIGN PATENT DOCUMENTS

| | | | | |
|---|---|---|---|---|
| DE | 196 28 152 A1 | | 1/1998 | |
| DE | 198 23 878 C1 | | 12/1999 | |
| DE | 102011001900 A1 | * | 10/2012 | ............... F16F 9/34 |
| EP | 3069994 B1 | | 11/2017 | |
| JP | 58191345 A | * | 11/1983 | ............... F16F 9/52 |
| WO | WO-2014102016 A1 | * | 7/2014 | ............ F03D 80/82 |

OTHER PUBLICATIONS

M.H. Naft and P.P. Seabase, "Applying the "Pressure" to a Liquid Spring Off-Highway Truck Suspension," Society of Automotive Engineers, Inc., Off-Highway Vehicle Meeting and Exhibition, 12 page booklet, Sep. 1977, 12 pages.
International Search Report and Written Opinion dated Apr. 12, 2022, issued in corresponding International Application No. PCT/CA2022/050028, filed Jan. 10, 2022, 7 pages.

* cited by examiner

*Primary Examiner* — Melanie Torres Williams
(74) *Attorney, Agent, or Firm* — Christensen O'Connor Johnson Kindness PLLC (57) ABSTRACT

A shock absorber includes a housing and an end wall slidably disposed within the housing. The end wall and the housing cooperate to define at least a portion of a cavity within the housing. The cavity is filled with a fluid, and a piston is slidably disposed within the cavity. Movement of the piston within the cavity compresses the fluid to provide a spring force. The shock absorber further includes a compensator coupled to the end wall. The compensator positions the end wall within the housing to change a volume of the cavity in response to a change in a temperature of a first element of the compensator.

19 Claims, 7 Drawing Sheets

TEMPERATURE COMPENSATED SHOCK ABSORBER

BACKGROUND

Liquid spring and oleo-pneumatic shock absorbers are commonly used in aircraft landing gear. The shock absorbers absorb the impact of landing by converting the impact energy into heat, which is then dissipated. Conversion of the impact energy into heat is typically accomplished by moving a piston through a fluid, such as oil, when the shock absorber extends and retracts. In a liquid spring, the compressibility (bulk modulus) of the oil is used to provide the spring function as well as damping when the fluid passes through orifices.

During operation of the shock absorbers, the shock absorber components heat up and expand due to thermal expansion. Oil in particular expands and contracts significantly in response to changes in temperature. For example, mineral oils can experience a volumetric change of approximately 4 to 5% in response to a temperature change of 60° C.

With respect to the overall impact of temperature changes to the performance of a shock absorber, the change in oil volume is preponderant. As the oil expands and contracts within the shock absorber, the internal pressure of the shock absorber increases and decreases, respectively. These changes in internal pressure impact the overall performance and, in particular, the spring curves of the shock absorbers. Aircraft landing gears are typically required to operate in temperatures ranging from −50° C. to +50° C. (or more), making this type of thermal behavior unacceptable.

The oleo-pneumatic shock absorber introduces gas as the spring element, which reduces the temperature sensitivity of the system, but an oleo-pneumatic shock absorber still suffers from significant spring curve variation with temperature, which complicates the design of the shock absorber and negatively impacts its performance.

SUMMARY

Disclosed embodiments of shock absorbers include thermal compensators that increase and decrease the internal volume of a shock absorber as the temperature changes. The changes in the internal volume correspond to and accommodate the thermal expansion and contraction of the spring fluids (typically oil) within the shock absorber. By increasing and decreasing the internal volume of the shock absorber, the thermal compensator maintains the oil at a more consistent pressure, thereby providing a more stable spring curve across the range of operating temperature.

A first embodiment of a shock absorber according to the present disclosure includes a housing and an end wall slidably disposed within the housing. The end wall and the housing cooperate to define at least a portion of a cavity within the housing. The shock absorber further includes a fluid disposed within the cavity and a piston slidably disposed within the cavity. Movement of the piston within the cavity compresses the fluid to provide a spring force. A compensator is coupled to the end wall and positions the end wall within the housing to change a volume of the cavity in response to a change in a temperature of a first element of the compensator.

In any embodiment, the change in the temperature of the first element is based at least in part on a temperature of the fluid.

In any embodiment, the compensator the first element is coupled to the housing, the first element having a first coefficient of thermal expansion. The compensator further includes a second element coupled to the first element and to the end wall, the second element having a second coefficient of thermal expansion different than the first coefficient of thermal expansion.

In any embodiment, the first element and the second element are concentric cylinders surrounding at least a portion of the housing.

In any embodiment, the second coefficient of thermal expansion is less than the first coefficient of thermal expansion.

In any embodiment, the second coefficient of thermal expansion is negative.

In any embodiment, a first end of the first element is fixedly positioned relative to the housing, and a second end of the first element is coupled to a first end of the second element, the second element extending from the first end of the second element toward the first end of the first element.

In any embodiment, the second element is parallel to the first element.

In any embodiment, the second element is coupled to the end wall by third element, a first end of the third element being coupled to a second end of the second element, a second end of the third element being fixedly positioned relative to the end wall, wherein the third element has a third coefficient of thermal expansion that is greater than the second coefficient of thermal expansion.

In any embodiment, the third coefficient of thermal expansion is equal to the first coefficient of thermal expansion.

In any embodiment, the third element is parallel to the second element.

A second embodiment of a shock absorber according to the present disclosure includes an outer housing portion comprising an end wall and an inner housing portion at least partially disposed within and slidingly engaging the outer housing portion. A piston is slidably disposed within the outer housing portion, so that the outer housing portion, the inner housing portion, and the piston cooperate to define at least a portion of a cavity. A compensator selectively positions the piston relative to the outer housing portion. The compensator moves the piston relative to the outer housing portion to change a volume of the cavity in response to a change in a temperature of the compensator.

In any embodiment, the shock absorber further comprises an orifice support tube extending from an end wall of the outer housing portion. the orifice support tube extends through the piston. The compensator comprises an elongate element having a first coefficient of thermal expansion and the orifice support tube has a second coefficient of thermal expansion that is less than the first coefficient of thermal expansion.

In any embodiment, a first end of the elongate element is fixedly positioned relative to the orifice support tube and a second end of the elongate element is coupled to the piston.

In any embodiment, the elongate element is a cylinder that surrounds the orifice support tube.

In any embodiment, the piston sealingly engages the orifice support tube.

In any embodiment, a first end of the elongate element is fixedly positioned relative to the orifice support tube, the elongate element extending through the piston, a second end of the elongate element being positioned between the piston and the end wall.

In any embodiment, the piston sealingly engages the elongate element.

In any embodiment, the second end of the elongate element being coupled to a stop that limits movement of the piston toward the end wall, the elongate element positioning the stop according to a temperature of the elongate element.

In any embodiment the stop is a lever rotatably coupled at one end about an axis that is fixed relative to the orifice support tube, a second end of the elongate element being rotatably coupled to the lever.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of disclosed subject matter will become more readily appreciated as the same become better understood by reference to the following detailed description, when taken in conjunction with the accompanying drawings, wherein.

DETAILED DESCRIPTION

Figure 1:
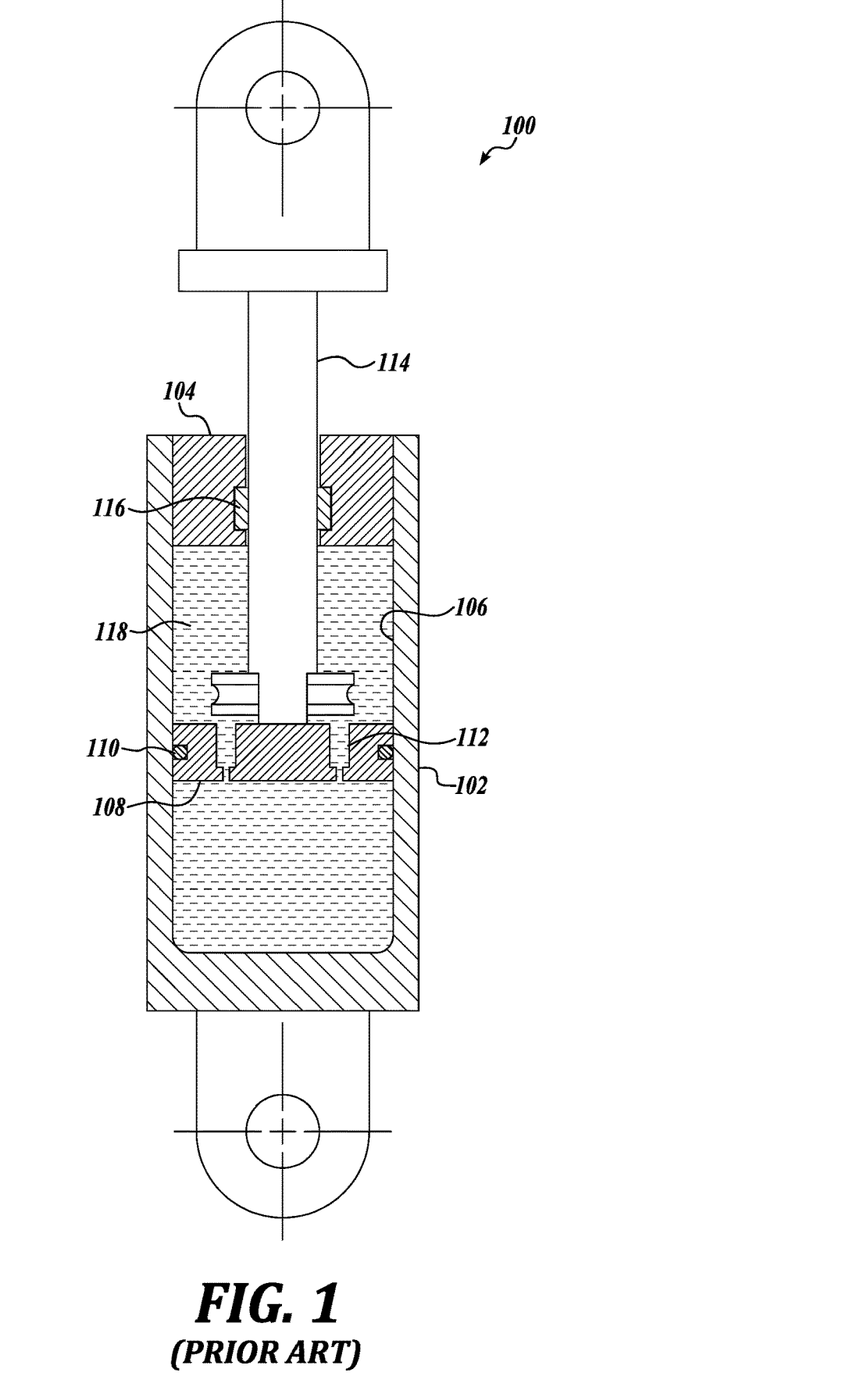
FIG. 1 shows a cross-sectional view of a known liquid spring shock absorber.

FIG. 1 shows a cross-sectional view of a known liquid spring shock absorber 100. The shock absorber 100 includes a cylindrical housing 102 with an end wall 104 fixedly coupled thereto to define an interior cavity 106. The cavity 106 is filled with a fluid 118, such as oil. A piston 108 is slidably disposed within the cavity 106. One or more seals 110 are mounted around the perimeter of the piston 108 to sealingly engage the piston with the wall of the cavity 106. A plurality of orifices 112 extend through the piston 108. An elongate rod 114 is coupled at one end to the piston 108 and extends through an aperture in the end wall 104. One or more seals 116 are mounted in the aperture in the end wall 104 and provide sealing engagement between the rod 114 and the end wall. As the piston 108 reciprocates within the housing 102, the fluid 118 is compressed and provides a resistive force to the piston. Movement of the piston 108 within the housing also forces fluid through the orifices 112 in the piston, which provide a damping force to the shock absorber 100.

Figure 2:
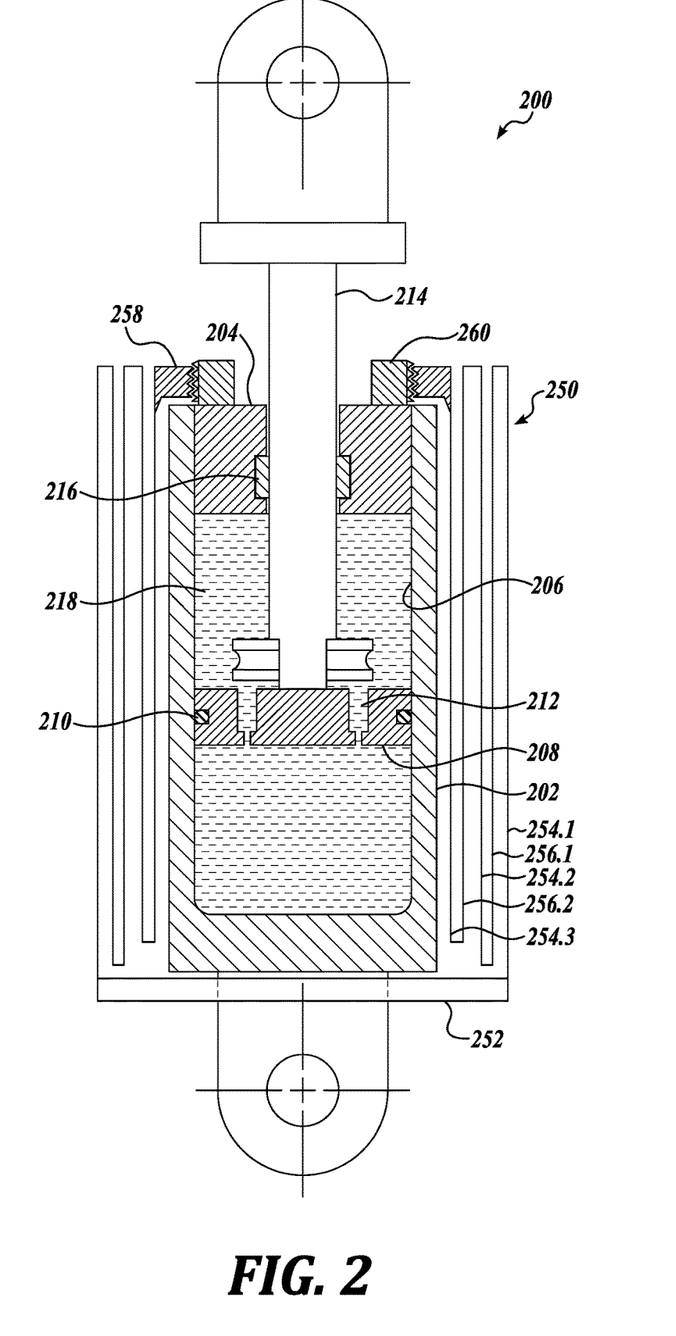
FIG. 2 shows cross-sectional view of a liquid spring shock absorber with a temperature compensator according to a first representative embodiment of the present disclosure.
Figure 3:
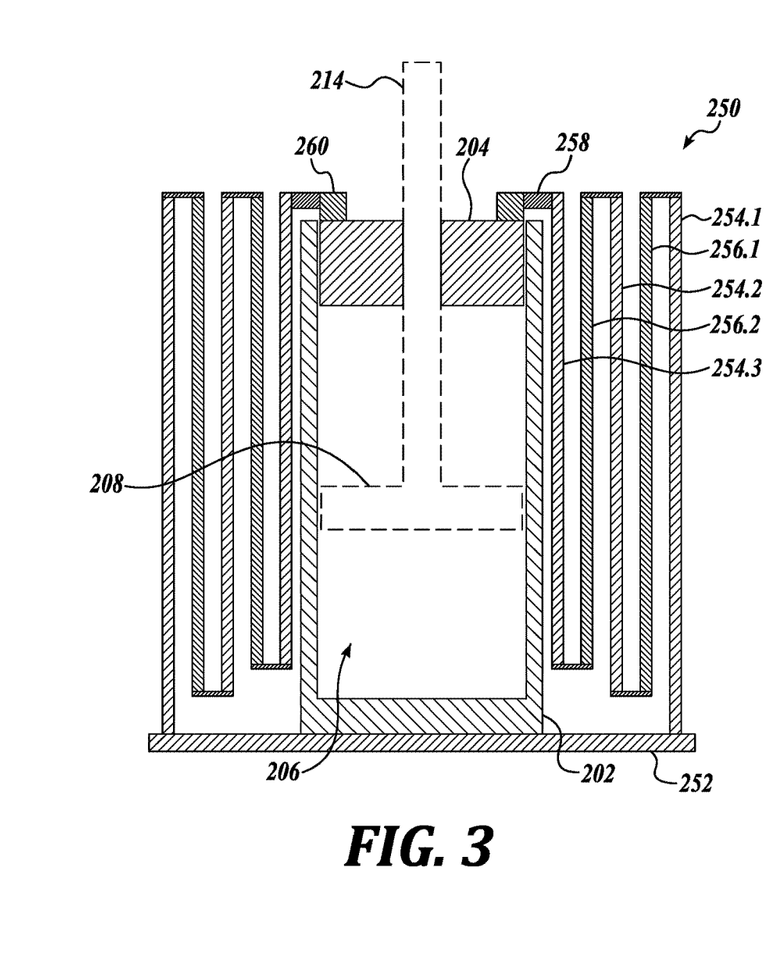
FIG. 3 shows the temperature compensator of FIG. 2 at a first temperature.
Figure 4:
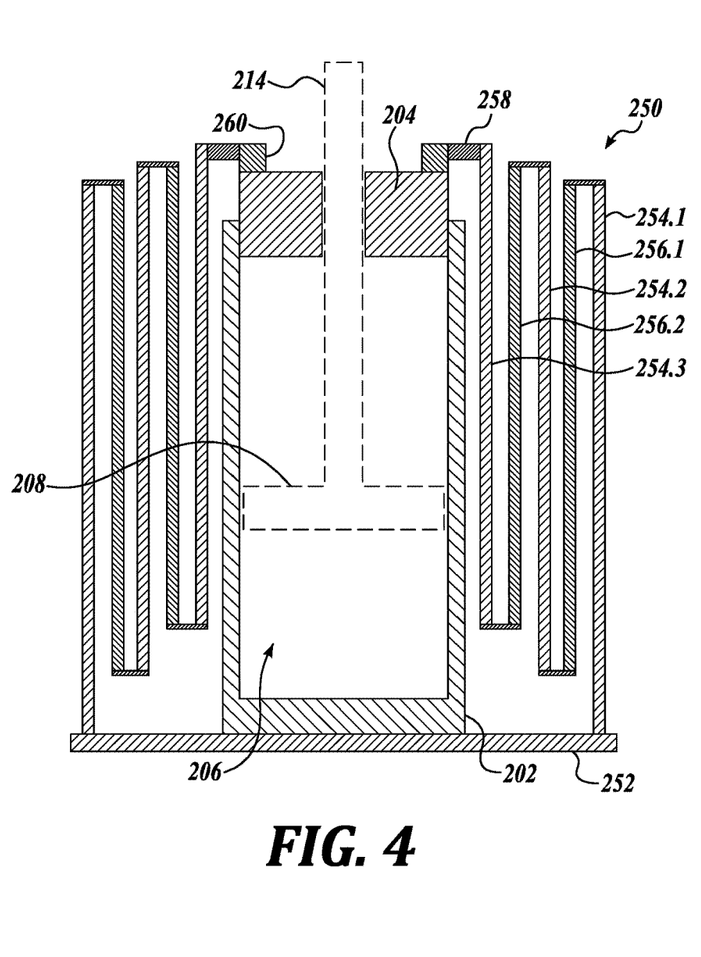
FIG. 4 shows the temperature compensator of FIG. 2 at a second temperature.

Referring now to FIGS. 2-4, a first representative embodiment of a shock absorber 200 with a thermal compensator 250 according to a first representative embodiment of the present disclosure is shown. The shock absorber 200 shown in FIGS. 2-4 is similar to the shock absorber 100 shown in FIG. 1, wherein components shown in FIG. 1 with a reference number 1XX generally corresponds to a component shown in FIGS. 2-4 with a reference number 2XX. For the sake of brevity, not all components of the shock absorber 200 will be described with the understanding that the components are similar to corresponding components of previously described shock absorber 100 except as otherwise noted.

As best shown in FIG. 2, the shock absorber 200 includes an inner cavity 206 defined by a housing 202 and an end wall 204. Unlike the end wall 104 of the shock absorber 100 of FIG. 1, the end wall 204 of the shock absorber 200 is slidably associated with the housing 202 such that the end wall 204 can be moved relative to the housing 202 to increase or decrease the volume of the cavity 206. In this regard, the end wall 204 is configured to selectively slide further into and out of the housing 202 while maintain sealing engagement with the interior walls of the housing 202 in order to decrease and increase, respectively, the volume of the cavity 206.

The position of the end wall 204 and, therefore, the volume of the cavity 206 is controlled by the thermal compensator 250 according to the temperature of certain elements that form part of the thermal compensator. As explained in further detail below, these elements are elongate elements that expand and contract as the temperature of the elements changes. Although the thermal compensator 250 controls the volume of the cavity 206 according to the temperature of elements located outside of the cavity rather than the temperature of the oil within the cavity 206, it will be appreciated that there is a general correlation between the temperature of the oil and the temperature of the thermal compensator elements. In this regard, components of the shock absorber are in close proximity to each other and are subjected to similar environmental conditions, including heating and cooling ambient temperatures. Further, the components are connected to each other and/or are in close proximity to each other such that heat is transferred from a higher temperature component to a lower temperature component through conduction, convection, or a combination thereof. In particular, when the shock absorber converts impact energy into heat, the oil is heated, which in turn heats the compensator. Because of the correlation between the temperature of the oil inside the shock absorber and the shock compensator elements, the compensator is able to adjust the volume of the cavity in a manner that compensates for changes in the temperature of the oil. As used herein, temperature changes will refer to changes to the temperature of the components of the compensator unless otherwise noted, with the understanding that there is a correlation between the temperature of these components and the temperature of the oil in the shock absorber.

The compensator 250 includes a plurality of elongate elements that react to (being heated and cooled) in order to move the end wall 204 relative to the housing 202. In the illustrated embodiment, the elongate elements include one or more first elongate elements 254.X having a first coefficient of thermal expansion (CTE) and one or more second elongate elements 256.X having a second CTE that is less than the first CTE, wherein X is an integer corresponding to the position of the elongate element.

In the illustrated embodiment of FIGS. 2-4, the elongate elements 254.X and 256.X are concentric cylinders arranged around the housing 202, wherein first elongate element 254.1 is the outermost elongate element, and the next inwardly adjacent elongate element is a second elongate element 256.1. Moving inward towards from the outermost second elongate element 256.1 toward the housing 202, the first and second elongate elements alternate, i.e., first elongate element 254.2, second elongate element 256.2, first elongate element 204.3. While the illustrated compensator includes three first elongate elements 254.X and two second elongate elements 256.X, it will be appreciated that other embodiments are possible in which different numbers of first and/or second elongate elements are utilized.

In the embodiment shown, the outermost first elongate element 254.1, i.e., the outermost cylindrical element with the first (higher) CTE, has a first end fixedly positioned relative to the housing 202. More specifically, the first end of the outermost elongate element 254.1 is fixedly coupled to a base 252 that is itself coupled to and extends radially from the housing 202.

The outermost second elongate element 256.1, i.e., the outermost cylindrical element with the second (lower) CTE, is coaxially disposed within the outermost first elongate element 254.1. A first end of the second elongate element 256.1 is coupled to a second end of the first elongate element 254.1. The second elongate element 256.1 extends back toward the first end of the outermost first elongate element 254.1 so that the second elongate element is nested within the first elongate element, and the first and second elongate elements have a cross-section that defines two C-shaped portions.

Except for the outermost first elongate element 254.1, which has a first end coupled to the base 254, each elongate element 254.X and 256.X has a first end coupled to a second end of the outwardly adjacent (surrounding) elongate element. With the exception of the innermost first elongate element 254.3, which is fixedly coupled to an end fitting 258, described below, each elongate element 254.X and 256.X has a second end coupled to a first end of the inwardly adjacent elongate element. As a result, the first and second elongate elements 254.X and 256.X cooperate to define a serpentine path from the base 252 to the end fitting 258, wherein the path includes parallel elongate portions that alternate between having a first CTE and a second CTE.

Still referring to FIG. 2, the innermost first elongate element 254 is coupled at a second end to the end fitting 258. The end fitting 258 is coupled to the coupler 260 that is attached to the end wall 204. The connection of the innermost first elongate element 254 to the end wall 204 in this manner enables the compensator 250 to move the end wall 204 relative to the housing 202 in response to temperature changes. In some embodiments, the end fitting 258 is threadedly coupled to the coupler 260 so that the end fitting can be selectively disengaged from the coupler to facilitate assembly, disassembly, and maintenance. In some embodiments, the coupler 260 is integrally formed with the end wall 204.

Referring now to FIGS. 3 and 4, operation of the compensator 250 will be described. FIG. 3 shows the compensator 250 at an initial temperature $T_0$, and FIG. 4 shows the compensator 250 at a temperature T that is higher than the initial temperature $T_0$. When the temperature changes from an initial temperature $T_0$ to a temperature T, the length of the elongate elements also change according to the following equation:

$$\Delta L = L_0 \times \alpha \times (T-T_0)$$

wherein:

$\Delta L$ is the change in length due to thermal expansion;

$L_0$ is the length of the elongate element at initial temperature $T_0$; and $\alpha$ is the coefficient of thermal expansion (CTE) for the elongate element material.

Because the CTE of the first elongate elements 254.X is greater than the CTE of the second elongate elements 256.X, a first elongate element 254.X having the same length as a second elongate element 256.X at an initial temperature will be longer than the second elongate element at a higher temperature and shorter than the second elongate element at a lower temperature. Examples of materials with higher CTEs include aluminum and polyether ether ketone (PEEK). Examples of materials with lower CTEs include the nickel-iron alloy 64FeNi, (trade name INVAR) and titanium-based alloys that exhibit low or negative CTEs, e.g. trade name ALLVAR. It will be appreciated that the noted materials are exemplary only, and other embodiments may include alternate materials having suitable strength, durability, and thermal characteristics. Such embodiments are contemplated and should be considered within the scope of the present disclosure.

Using elongate elements with different CTEs enables the compensator 250 to amplify the change in the volume of the cavity 206 for a given temperature change and compensator size. As shown in FIG. 3, when the compensator is at a first (initial) temperature, the elongate elements 254.X and 256.X are parallel and each has its own respective initial length. The distance between the base 252 and the end fitting 258 is controlled by the compensator 250. This, in turn, controls the position of the end wall 204 relative to the housing 202 and, thus, the volume of the cavity 206.

As the temperature increases from the first temperature (FIG. 3) to the second temperature (FIG. 4), the length of each first elongate element 254.X increases due to thermal expansion. At the same time, the lower CTE of the second elongate element 256.X causes each second elongate element to either (1) increase at lower rate due when the lower CTE is positive, or (2) decrease if the lower CTE is negative.

The arrangement of the first and second elongate elements 254.X and 256.X is such that the distance between the base 202 and the end fitting 258 increases with an increase in temperature. More specifically, the distance between the base 202 and the end fitting 258 increases by an amount equal to the sum of the increase of the lengths of the first elongate elements 254.X minus the sum of the increases of the lengths of the second elongate elements 256.X. For embodiments in which the second elongate elements have a negative CTE, the distance between the base 202 and the end fitting 258 increases by an amount equal the sum of the absolute values of the changes of the lengths of the first and second elongate elements 254.X and 256.X.

It will be appreciated that the number, orientation, and configuration of the first and second elongate elements is representative only. In some embodiments, one or more of the elongate elements are not cylindrical, but instead include one ore more linear elements arranged circumferentially around the housing. In some embodiments, the lengths of two or more elongate elements are the same at a given temperature. In some embodiments, the compensator includes stops that limit movement of the end wall 204 relative to the housing 202 to set upper and or lower limits on the volume of the cavity 206. These and other variations are contemplated and should be considered within the scope of the present disclosure.

The materials and configuration of the disclosed compensator 250 can be selected to suit the configuration, functional characteristics, and operating conditions of the shock absorber 200. In this regard, the compensator 250 can be optimized to maintain the pressure of the fluid 218 in the shock absorber within a predetermined range by increasing and decreasing the volume in the cavity 206 in a manner that corresponds to increases and decreases, respectively, in the temperature of the fluid. This optimization provides more consistent and reliable operation of the shock absorber 200.

Figure 5:
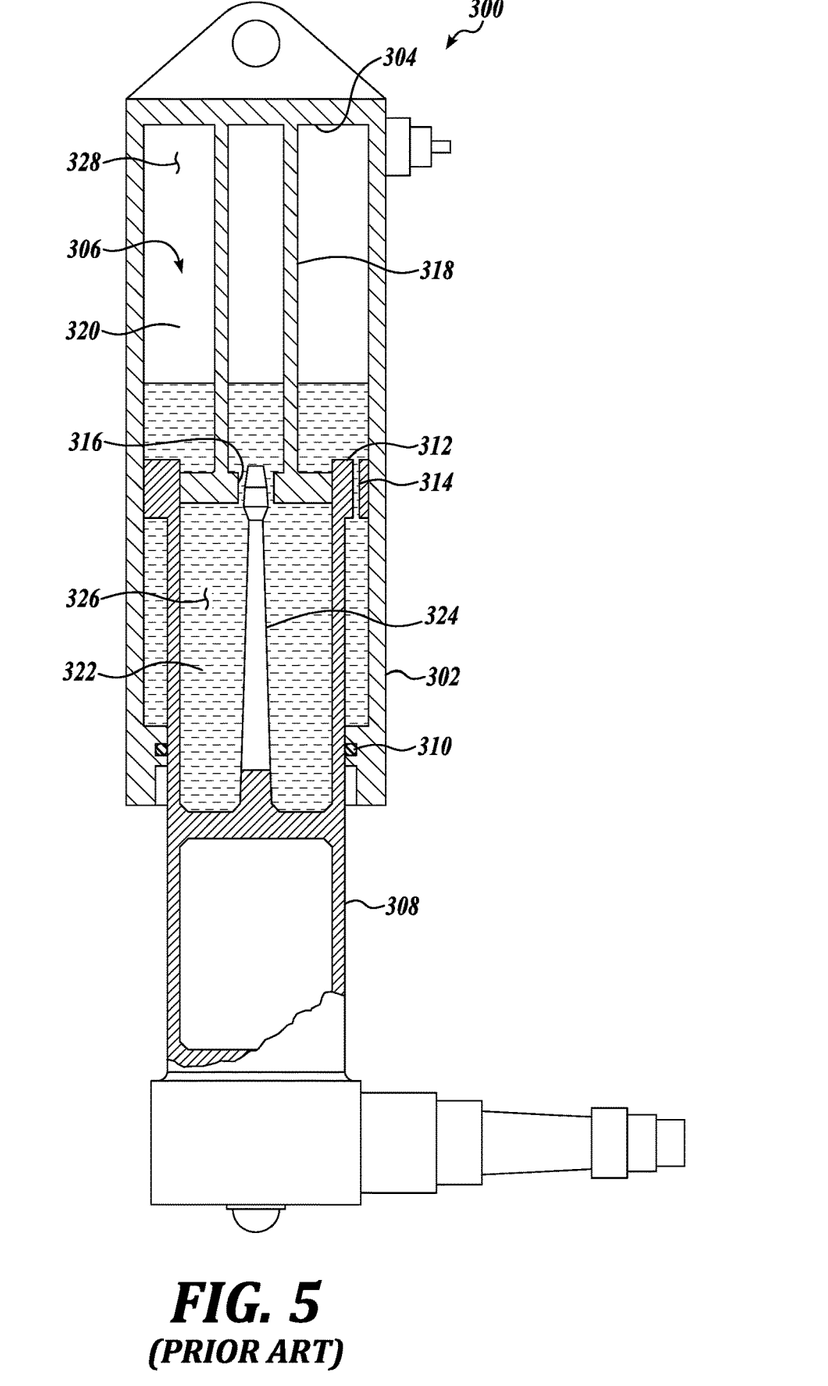
FIG. 5 shows a cross-sectional view of a known oleo-pneumatic shock absorber.

FIG. 5 shows a representative embodiment of a known oleo-pneumatic shock absorber 500 typical of the type used as the main strut of aircraft landing gears. The shock absorber 500 is disclosed in U.S. Patent Application Publication No. 2016/0327114, ("Schmidt"), assigned to Safran Landing Systems UK Ltd., the disclosure of which is incorporated by reference in its entirety herein.

The shock absorber 300 includes an inner housing portion 308, slidably coupled within an outer housing portion 302 by one or more bearings 312 with at least one orifice 314 extending therethrough. The housing portions 302 and 308 are sealingly engaged by a seal 310 and cooperate to define a cavity 306 having an upper chamber 320 and a lower chamber 322. The lower chamber 322 contains a fluid 326, such as oil, and the upper chamber 320 is at least partially filled with a gas 328, such as air. An orifice support tube 318 extends from an end wall 304 of the upper chamber 320 and fixedly positions an orifice 316 extending between the upper chamber 320 and the lower chamber. A metering pin 324 is fixedly secured to the inner housing portion 308 and extends through the orifice 316 to selectively limit the flow of the fluid 326 through the orifice.

When a load is applied to the shock absorber 300, such as during aircraft weight on wheels upon landing, the inner housing portion 308 slides into the outer housing portion 302 to compress the shock absorber. The volume of the cavity 306 is reduced, compressing the gas 328 to provide a resistive force. When load is removed from the shock absorber 300, such as following take off, the pressure of the compressed gas 328 drives the inner housing portion 308 out of the outer housing portion 302 so that the shock absorber 300 extends to assume a default length. As the shock absorber 300 compresses and extends, the fluid 326 is forced through the orifice 316 to provide viscous damping.

Figure 6:
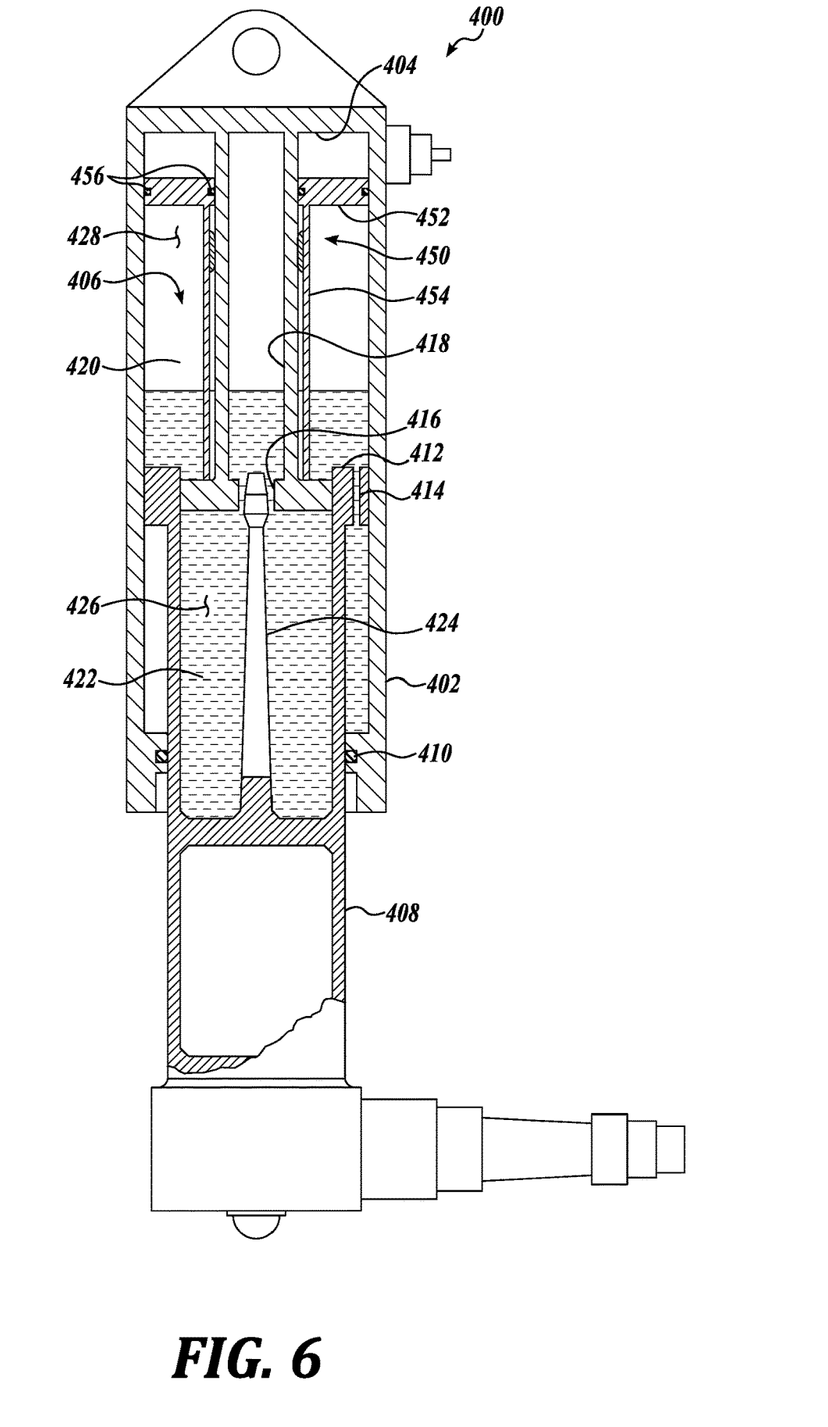
FIG. 6 shows a cross-sectional view of an oleo-pneumatic shock absorber with a temperature compensator according to a second representative embodiment of the present disclosure.

FIG. 6 shows an oleo-pneumatic shock absorber 400 similar to the shock absorber 300 shown in FIG. 5 except that the shock absorber 400 includes a thermal compensator 450 according to a second representative embodiment of the present disclosure. Components shown in FIG. 5 with a reference number 3XX generally corresponds to a component shown in FIG. 6 with a reference number 4XX. For the sake of brevity, not all components of the shock absorber 400 will be described with the understanding that the components are similar to corresponding components of the shock absorber 300 except as otherwise noted.

As shown in the embodiment of FIG. 6, the compensator 450 includes a piston 452 slidable disposed within the upper chamber 420 of the shock absorber 400. Seals 456 are mounted to the inner and outer edges of the piston 452 to provide sealing engagement with the orifice support tube 418 and the wall of the cavity 406, respectively. Thus, the piston 456, rather than the end wall 404, cooperates with the housing 402 to define the portion of the cavity 406 that surrounds the orifice support tube 418.

In the embodiment shown, an elongate element 454 is coupled at one end to a portion of the orifice support tube 418 and at the other end to the piston 452. In some embodiments, the elongate element 454 has a cylindrical configuration that is coaxial with and surrounds the orifice support tube 418. In some embodiments, the elongate element 454 includes one ore more linear members positioned circumferentially around the orifice support tube 418. It will be appreciated that the elongate element 454 can have any suitable configuration that positions the piston 452 relative to the orifice support tube 418.

The elongate element 454 is constructed to have a higher CTE than the orifice support tube 418. In some embodiments, the elongate element is made from aluminum or PEEK. In some embodiments, the orifice support tube is made from INVAR or ALLVAR. In some embodiments, the orifice support tube 418 is integrally formed with the housing 402. In some embodiments, the orifice support tube 418 is formed separate from the housing 402 and/or from different materials and then coupled to the housing. These and other embodiments that provide an elongate element 454 with a higher CTE than the orifice support tube 418 are contemplated and should be considered within the scope of the present disclosure.

Still referring to FIG. 6, the orifice support tube 418 and the elongate element 454 cooperate to position the piston 452 within the housing 402. As the operating temperature of the elongate element 454 increases (along with the temperature of the oil in the shock absorber), the length of the elongate element 454 increases due to thermal expansion. At the same time, the length of the orifice support tube 418 also changes due to thermal expansion. If the orifice support tube 418 has a positive CTE, then the length of the orifice support tube increases by an amount that is less than the increase of the elongate element 454. If the orifice support tube 418 has a negative CTE, then the length of the orifice support tube decreases.

The increase in the length of the elongate element 454 combined with the smaller increase or the decrease in the length of the orifice support tube 418 drives the piston 452 toward the end wall 404 of the housing 402. This movement of the piston 452 increases the volume of the cavity 406. The increased cavity volume accommodates the volume change of the fluid caused by the temperature increase, thereby maintaining the pressure within the shock absorber within a predetermined range. As the operating temperatures decrease, the compensator 450 decreases the volume of the cavity 406 by moving the piston 408 away from the end wall 404 of the housing 402.

Similar to the compensator 250 shown in FIG. 2, the materials and configuration of the compensator 450 of FIG. 4 can be selected to suit the configuration, functional characteristics, and operating conditions of the shock absorber 400. Thus, the compensator 450 can be optimized to maintain the pressure of the fluid 418 in the shock absorber 400 within a predetermined range by increasing and decreasing the volume in the cavity 406 according to increases and decreases, respectively, in the temperature of the fluid, thereby providing more consistent and reliable operation of the shock absorber 400.

Figure 7:
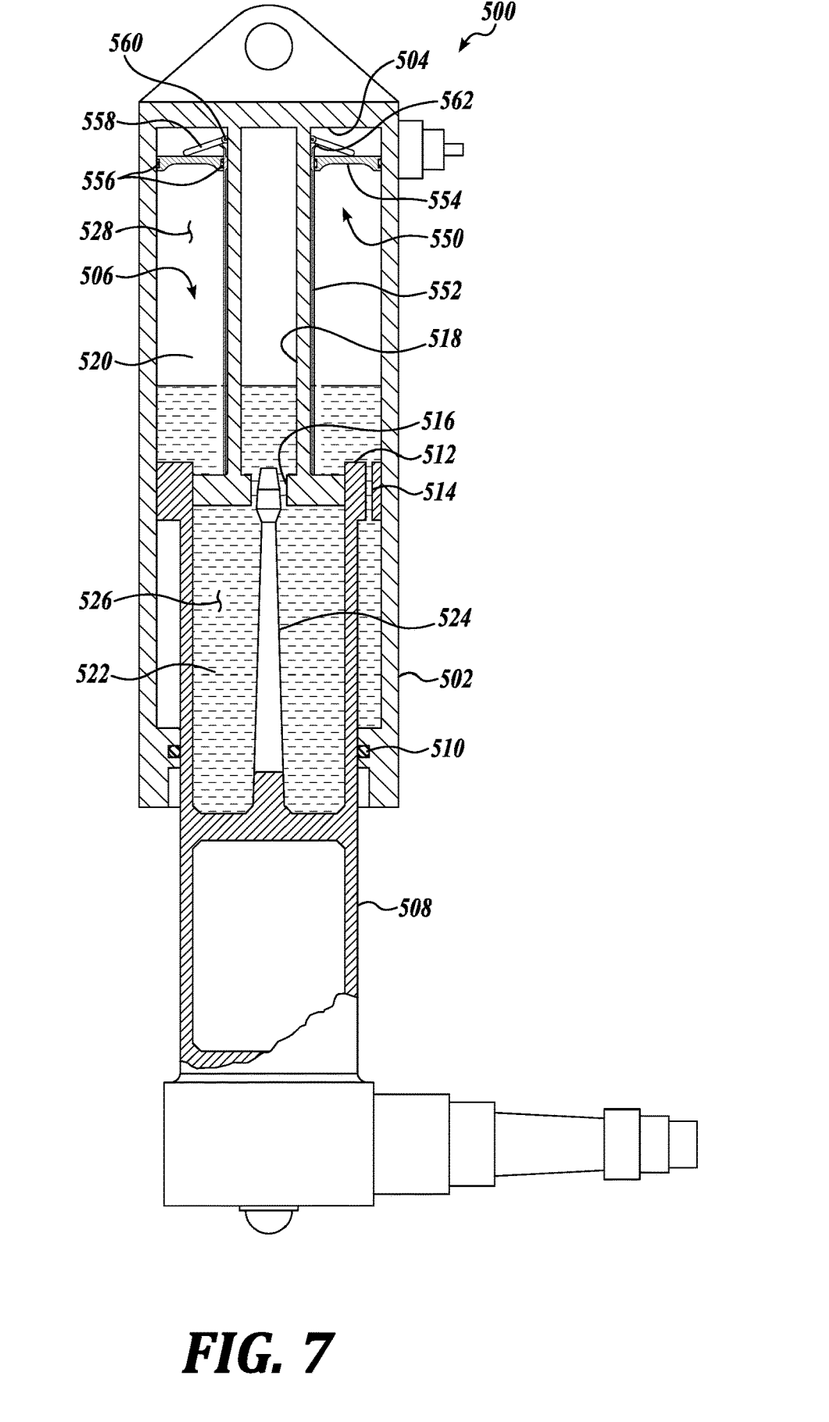
FIG. 7 shows an oleo-pneumatic shock absorber with a temperature compensator according to a third representative embodiment of the present disclosure.
Figure 8:
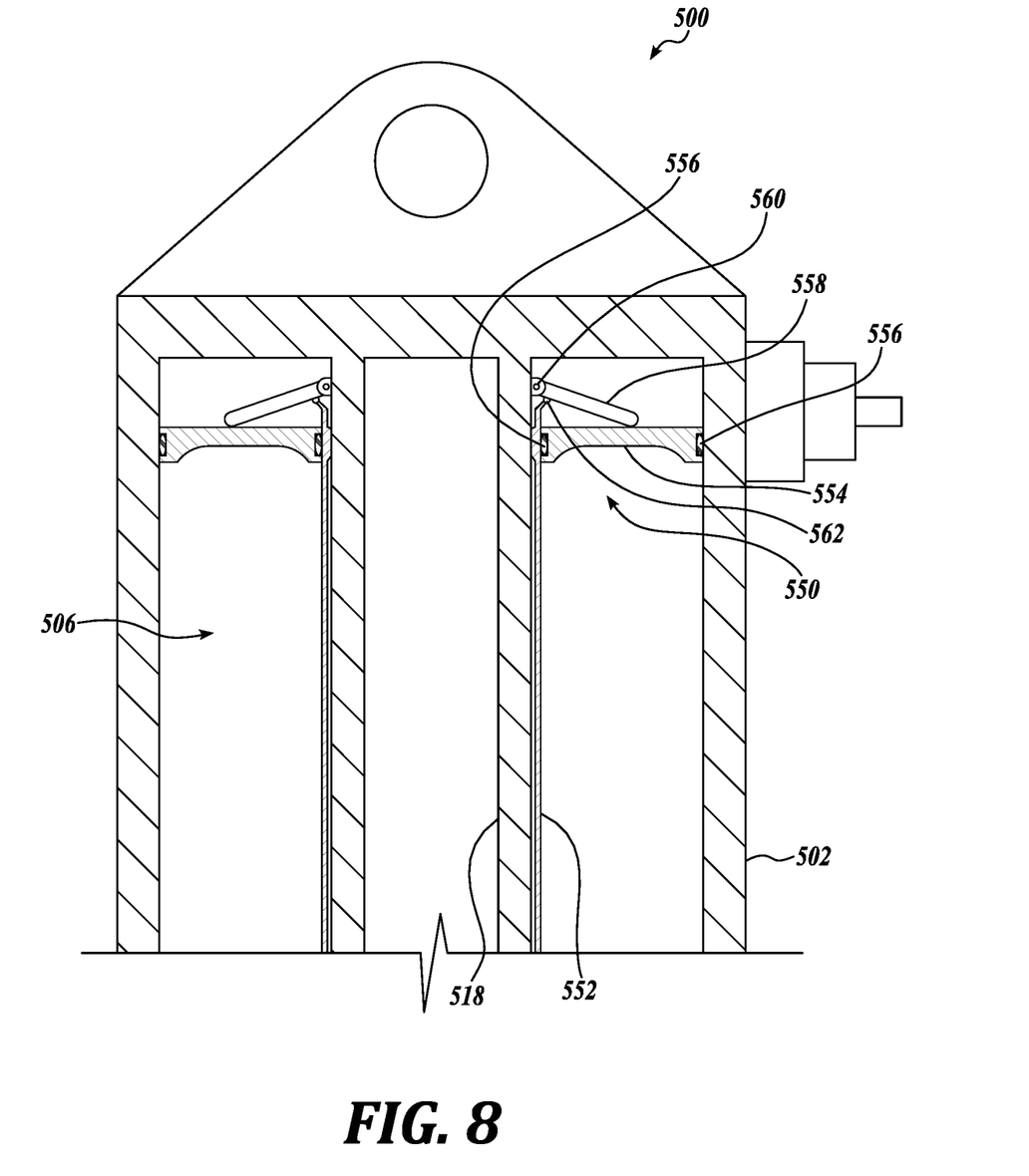
FIG. 8 shows an enlarged partial view of the oleo-pneumatic shock absorber shown in FIG. 7.

Referring now to FIGS. 7 and 8, an oleo-pneumatic shock absorber 500 with a thermal compensator 550 according to a third representative embodiment is shown. The shock absorber 500 is similar to the shock absorber 400 shown in FIG. 6, wherein a component shown in FIG. 6 with a reference number 4XX generally corresponds to a component shown in FIGS. 7 and 8 with a reference number 5XX. For the sake of brevity, the shock absorber 500 will be described with the understanding that the components are similar to corresponding components of the shock absorber 300 unless otherwise noted.

In the embodiment shown in FIGS. 7 and 8, the compensator 550 includes an elongate element 552 in the form of a cylinder that surrounds the orifice support tube 518 and defines an inner surface of the upper chamber 520. A lower end of the elongate element 552 is fixedly positioned relative to the orifice support tube 518, and an interior surface of the elongate element slidingly engages the outer surface of the orifice support tube. Similar to the previously describe embodiment of FIG. 6, the elongate element 552 has a CTE that is greater than that of the orifice support tube 518.

The compensator 550 further includes a piston 552 slidable disposed within the upper chamber 520 of the shock absorber 500. Seals 556 are mounted to the inner and outer edges of the piston 552 to provide sealing engagement with the elongate element 552 and the wall of the cavity 506, respectively. Thus, the piston 556, rather than the end wall 504, cooperates with the housing 502 and the first elongate element to define the portion of the cavity 506 that surrounds the orifice support tube 518.

One or more levers 558 are positioned between the piston 554 and the end wall 504 of the housing. Each lever 558 is rotatable about an axis 560 that is fixedly positioned relative to the housing 502 and is located near a first end of the lever. In the illustrated embodiment, the levers 558 are rotatably coupled to the orifice support tube 318; however, it will be appreciated that embodiments are possible in which the levers 558 are rotatably coupled to the end wall 504 of the housing 502 or to any other suitable structure.

Each lever 558 is also rotatably coupled to the elongate element 552 about an axis 562. The rotatable connections about axes 560 and 562 control the position of the lever 558. In this regard, axis 560 remains fixed relative to the housing, while axis 562 moves with the expansion and contraction of the elongate element 552. With the first end of the lever 558 rotatably coupled about axis 562 in a generally fixed position relative to the housing 502, movement of axis 562 rotates the lever about axis 560 to control the orientation of the lever.

A second end of each lever 558 engages the piston 554 so that the levers 558 act as a stop that limits movement of the piston in the direction of the end wall 504. The pressure in the cavity 506 provides a force on the piston 554 that biases the piston toward the end wall 504 so that the piston remains engaged with the second end of the lever. In this manner, the position of the levers 558 controls the position of the piston 554 within the housing 502 and, therefore, the size of the cavity 506.

As the temperature increases, orifice support tube 516 expands if the CTE of the orifice support tube is positive or contracts if the CTE of the orifice support tube is negative. The temperature increase also increases the length of the elongate element 552. Because the CTE of the elongate element 552 is larger than that of the orifice support tube 516, the upper end of the elongate element and, therefore, axis 562 move toward the end wall 504 of the housing 502, regardless of whether the CTE of the orifice support tube 516 is positive or negative. Movement of axis 562 repositions the lever 554 to allow the piston 554 to move toward the end wall 504 of the housing 502, thereby increasing the volume of the cavity 506.

The levers 558 of the illustrated compensator 550 act as a mechanical amplifier that utilizes the geometry of the levers and their attachments to the other components of the shock absorber 500 to provide movement of the piston 554 that is greater than the elongation or contraction of the elongate element 552. It will be appreciated that the number, position, location, and attachment points of the levers 558 may vary in other embodiments, and such embodiments should be considered within the scope of the present disclosure.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known features have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A shock absorber, comprising:
   a housing;
   an end wall slidably disposed within the housing, the end wall and the housing cooperating to define at least a portion of a cavity within the housing;
   a fluid disposed within the cavity;

a piston slidably disposed within the cavity, movement of the piston within the cavity compressing the fluid to provide a spring force; and a compensator coupled to the end wall, the compensator comprising:

a first element coupled to the housing and having a first coefficient of thermal expansion; and a second element coupled to the first element and to the end wall, the second element having a second coefficient of thermal expansion different than the first coefficient of thermal expansion, wherein the compensator positions the end wall within the housing to change a volume of the cavity in response to a change in a temperature of the first element.

2. The shock absorber of claim 1, wherein the change in the temperature of the first element is based at least in part on a temperature of the fluid.

3. The shock absorber of claim 1, wherein the first element and the second element are concentric cylinders surrounding at least a portion of the housing.

4. The shock absorber of claim 1, wherein the second coefficient of thermal expansion is less than the first coefficient of thermal expansion.

5. The shock absorber of claim 4, wherein the second coefficient of thermal expansion is negative.

6. The shock absorber of claim 4, wherein a first end of the first element is fixedly positioned relative to the housing, and a second end of the first element is coupled to a first end of the second element, the second element extending from the first end of the second element toward the first end of the first element.

7. The shock absorber of claim 6, wherein the second element is parallel to the first element.

8. The shock absorber of claim 6, wherein the second element is coupled to the end wall by third element, a first end of the third element being coupled to a second end of the second element, a second end of the third element being fixedly positioned relative to the end wall, wherein the third element has a third coefficient of thermal expansion that is greater than the second coefficient of thermal expansion.

9. The shock absorber of claim 8, wherein the third coefficient of thermal expansion is equal to the first coefficient of thermal expansion.

10. The shock absorber of claim 8, wherein the third element is parallel to the second element.

11. A shock absorber, comprising:

an outer housing portion comprising an end wall;

an inner housing portion at least partially disposed within and slidingly engaging the outer housing portion;

a piston slidably disposed within the outer housing portion, wherein the outer housing portion, the inner housing portion, and the piston cooperate to define at least a portion of a cavity; and a compensator selectively positioning the piston relative to the outer housing portion, wherein the compensator moves the piston relative to the outer housing portion to change a volume of the cavity in response to a change in a temperature of the compensator.

12. The shock absorber of claim 11, further comprising an orifice support tube extending from an end wall of the outer housing portion, the orifice support tube extending through the piston, wherein the compensator comprises an elongate element having a first coefficient of thermal expansion and the orifice support tube has a second coefficient of thermal expansion that is less than the first coefficient of thermal expansion.

13. The shock absorber of claim 12, wherein a first end of the elongate element is fixedly positioned relative to the orifice support tube and a second end of the elongate element is coupled to the piston.

14. The shock absorber of claim 13, wherein the elongate element is a cylinder that surrounds the orifice support tube.

15. The shock absorber of claim 13, wherein the piston sealingly engages the orifice support tube.

16. The shock absorber of claim 12, wherein a first end of the elongate element is fixedly positioned relative to the orifice support tube, the elongate element extending through the piston, a second end of the elongate element being positioned between the piston and the end wall.

17. The shock absorber of claim 16, wherein the piston sealingly engages the elongate element.

18. The shock absorber of claim 16, the second end of the elongate element being coupled to a stop that limits movement of the piston toward the end wall, the elongate element positioning the stop according to a temperature of the elongate element.

19. The shock absorber of claim 18, wherein the stop includes a lever rotatably coupled at one end about an axis that is fixed relative to the orifice support tube, a second end of the elongate element being rotatably coupled to the lever.

* * * * *